United States Patent
Yang et al.

(10) Patent No.: US 9,516,071 B2
(45) Date of Patent: Dec. 6, 2016

(54) VIDEO CONFERENCING SYSTEM AND ASSOCIATED INTERACTION DISPLAY METHOD

(71) Applicant: Quanta Computer Inc., Taoyuan (TW)

(72) Inventors: Rong-Chin Yang, Taoyuan (TW); Yen-Ching Yu, Taoyuan (TW); Wei-Tsun Lee, Taoyuan (TW); Ching-Hui Chiu, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 14/635,312

(22) Filed: Mar. 2, 2015

(65) Prior Publication Data
US 2016/0205348 A1      Jul. 14, 2016

(30) Foreign Application Priority Data

Jan. 9, 2015 (TW) .............................. 104100680 A

(51) Int. Cl.
*H04N 7/14* (2006.01)
*H04L 29/06* (2006.01)
(Continued)

(52) U.S. Cl.
CPC ........... *H04L 65/1069* (2013.01); *G06F 3/044* (2013.01); *G06F 3/0416* (2013.01); *G06F 3/0421* (2013.01);
(Continued)

(58) Field of Classification Search
CPC ...................................................... H04N 7/14
(Continued)

(56) References Cited

U.S. PATENT DOCUMENTS

2009/0309956 A1* 12/2009 Hawkins ............ G06K 9/00402
  348/14.08
2012/0229590 A1*  9/2012 Barrus ................ H04L 12/1822
  348/14.08

(Continued)

FOREIGN PATENT DOCUMENTS

TW   200623829   7/2006
TW   201332359   8/2013

OTHER PUBLICATIONS

Chinese language office action dated Mar. 21, 2016, issued in application No. TW 104100680.

*Primary Examiner* — Olisa Anwah
(74) *Attorney, Agent, or Firm* — McClure, Qualey & Rodack, LLP

(57) ABSTRACT

A video conferencing system is provided. The video conferencing system includes a first video conferencing apparatus and a second video conferencing apparatus. A video/audio connection of a video conference between the first and second video conferencing apparatuses is established via an SIP channel. When the video/audio connection of the video conference has been established, a transparent layer is activated on the first and second conferencing apparatuses. When the first and second video conferencing apparatuses are switched to an external output projection mode, first and second touch events are input on the first and second video conferencing apparatus, and the first and second touch events are respectively transmitted to the second and first video conferencing apparatuses via the SIP channel. The first and second video conferencing apparatuses draw the second and first touch events on a first user interface and a second user interface.

10 Claims, 4 Drawing Sheets

(51) Int. Cl.
*G06F 3/041* (2006.01)
*G06F 3/044* (2006.01)
*G06F 3/042* (2006.01)
*H04M 3/56* (2006.01)

(52) U.S. Cl.
CPC .......... *H04L 65/1006* (2013.01); *H04M 3/567* (2013.01); *H04N 7/147* (2013.01)

(58) Field of Classification Search
USPC ................................ 348/14.01, 14.03, 14.07
See application file for complete search history.

(56) References Cited

U.S. PATENT DOCUMENTS

| | | | | |
|---|---|---|---|---|
| 2012/0254773 | A1* | 10/2012 | Viswanathan | G06F 3/0483 715/753 |
| 2013/0293663 | A1* | 11/2013 | Chang | H04N 7/147 348/14.02 |
| 2016/0092070 | A1* | 3/2016 | Chen | G06F 3/04817 345/173 |

* cited by examiner

VIDEO CONFERENCING SYSTEM AND ASSOCIATED INTERACTION DISPLAY METHOD

CROSS REFERENCE TO RELATED APPLICATIONS

This Application claims priority of Taiwan Patent Application No. 104100680, filed on Jan. 9, 2015, the entirety of which is incorporated by reference herein.

BACKGROUND OF THE INVENTION

Field of the Invention

The present invention relates to video conferencing, and, in particular, to an interactive video conferencing apparatus and an associated interactive video conferencing display method.

Description of the Related Art

Conventionally, only telephony service is provided in the public switched telephone network. With highly developed network technologies, it has become a trend to use video calls that provide real-time voices and images to replace conventional telephone calls. Currently, video calls are established based on communications protocols such as SIP or H.323. A video channel and an audio channel are built between participants in a video call. The images captured by the camera of each participant are exchanged through the video channel, and the acoustics signal captured by the microphone of each participant is exchanged through the audio channel.

In a video conference, it is convenient for a user to use slides to clearly explain his concepts or ideas, and the slides can be displayed by a projector or an LCD display via the HDMI interface. However, a lot of bandwidth is needed when the screens are exchanged by different participants in the video conference, and thus there is demand for a video conferencing system to solve the aforementioned issue.

BRIEF SUMMARY OF THE INVENTION

A detailed description is given in the following embodiments with reference to the accompanying drawings.

In an exemplary embodiment, a video conferencing system is provided. The video conferencing system comprises a first video conferencing apparatus having a first touch panel, and a second video conferencing apparatus having a second touch panel. A video/audio connection of a video conference between the first video conferencing apparatus and the second video conferencing apparatus is established via a session initialization protocol (SIP) channel. When the video/audio connection of the video conference has been established, a transparent layer is activated on the first video conferencing apparatus and the second conferencing apparatus. When the first video conferencing apparatus and the second video conferencing apparatus are switched to an external output projection mode, a first touch event and a second touch event are input on the first touch panel and the second touch panel, and the first touch event and the second touch event are respectively transmitted to the second video conferencing apparatus and the first video conferencing apparatus via the SIP channel. The first video conferencing apparatus and the second video conferencing apparatus draw the second touch event and the first touch event on a first user interface and a second user interface, wherein the first user interface is identical to the second user interface.

In another exemplary embodiment, a video conference interaction display method for use in a video conferencing system is provided. The video conferencing system comprises a first video conferencing apparatus and a second video conferencing apparatus. The method comprises the steps of: establishing a video/audio connection of a video conference between the first video conferencing apparatus and the second video conferencing apparatus via a session initialization protocol (SIP) channel; activating a transparent layer on the first video conferencing apparatus and the second conferencing apparatus when the video/audio connection of the video conference has been established; when the first video conferencing apparatus and the second video conferencing apparatus are switched to an external output projection mode, utilizing the first video conferencing apparatus and the second conferencing apparatus to input a first touch event and a second touch event; respectively transmitting the first touch event and the second touch event to the second video conferencing apparatus and the first video conferencing apparatus via the SIP channel; and utilizing the first video conferencing apparatus and the second video conferencing apparatus to draw the second touch event and the first touch event on a first user interface and a second user interface, wherein the first user interface is identical to the second user interface.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
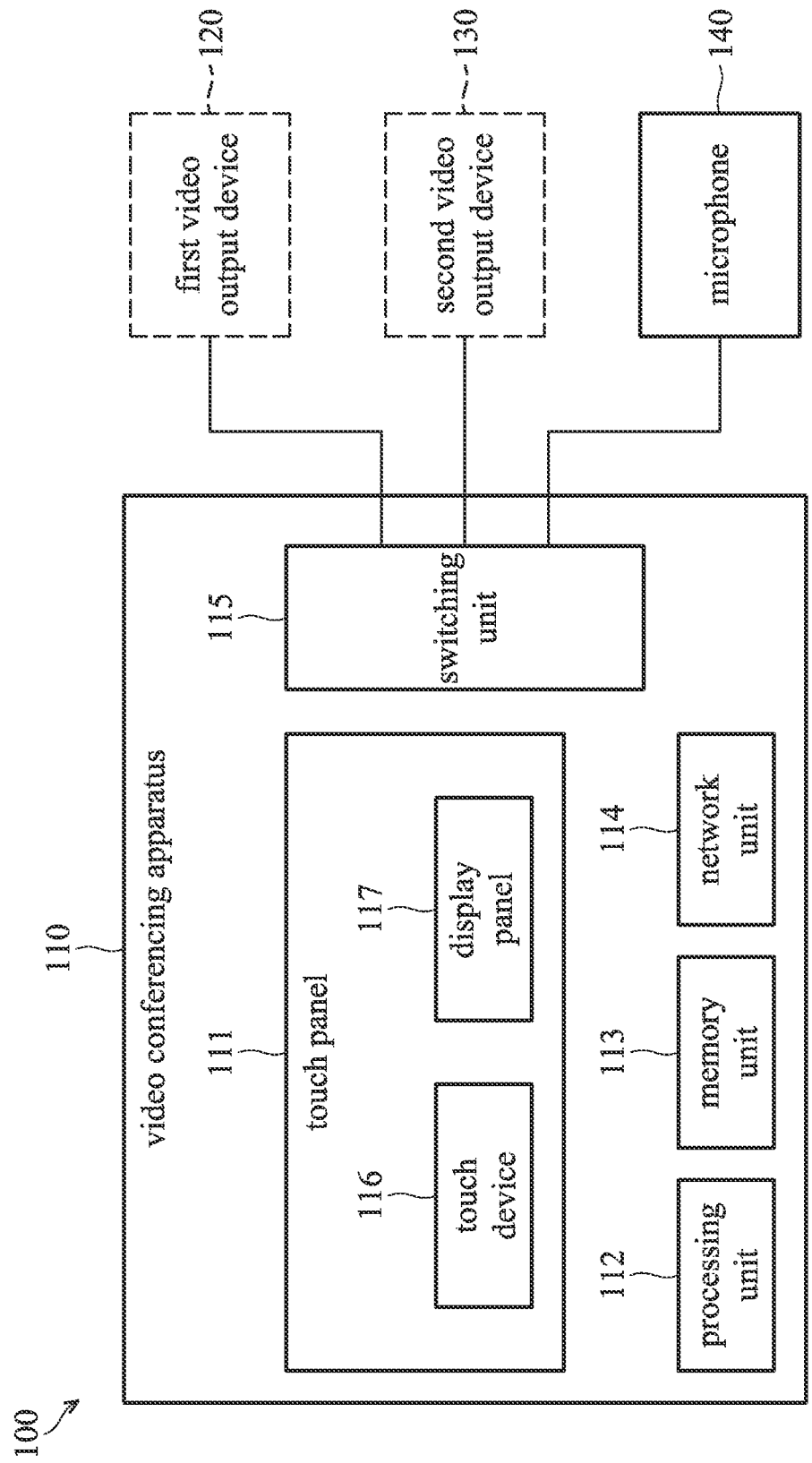
FIG. 1 is a block diagram of a video conferencing system in accordance with an embodiment of the invention.

FIG. 1 is a block diagram of a video conferencing system in accordance with an embodiment of the invention. The video conferencing system 100 comprises a video conferencing apparatus 110, and a microphone 140. The video conferencing apparatus 110, such as a personal computer, a laptop, a smartphone, or a tablet PC, is configured to perform a video conference with another video conferencing apparatus of another user through a channel based on "Session Initiation Protocol (SIP)" or H.323 protocol over a network. In an embodiment, the video conferencing apparatus 110 comprises a touch panel 111, a processing unit 112, a memory unit 113, a network unit 114, and a switching device 115. In an embodiment, the touch panel 111 comprises a touch device 116, and a display panel 117. The touch device is capable of detecting touch events on the surface of the touch panel 111, and the display panel 117 displays video signals from the video conferencing apparatus 110. For example, the touch panel 111 can be an optical touch panel or a capacitive touch panel, but the invention is not limited thereto.

The memory unit 113 is configured to store an operating system and corresponding drivers and application of the video conferencing apparatus 110 (e.g. in a non-volatile memory), and the processing unit 112 may load the operating system, drivers and applications to the volatile-memory of the memory unit 113. The network unit 114 is compatible with SIP and H.323 protocols, and allows the video conferencing apparatus 110 to establish the connection of a video conference with another video conferencing apparatus through a video/audio channel over a network based on the SIP or H.323 protocol.

Figure 2A:
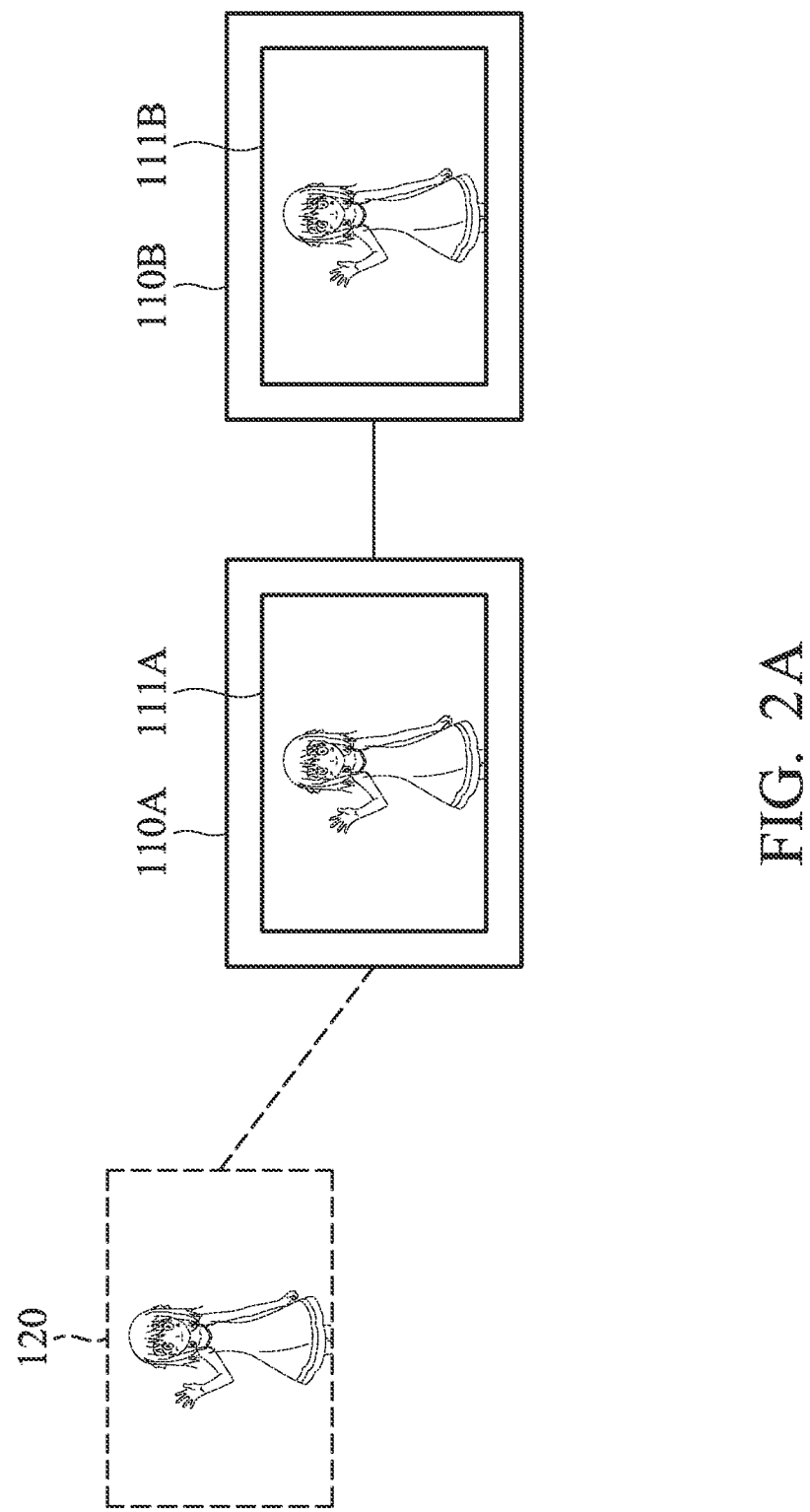
FIG. 2A is a diagram of a video conference using the video conferencing apparatus in accordance with an embodiment of the invention.

FIG. 2A is a diagram of a video conference using the video conferencing apparatus in accordance with an embodiment of the invention. In an embodiment, when user A utilizes his video conferencing apparatus 110A to establish connection of a video conference with the video conferencing apparatus 110B of user B, user A may switch the screen of the video conference to the video output of another electronic device, such as a video output signal from the HDMI or VGA interface of a laptop (e.g. the first video output device 120), or the video output signal of a camera (e.g. the second video output device 130), but the invention is not limited thereto. User A may use the switching device 115 to switch the input video source of the video conferencing apparatus 100. For example, when user A has switched the video conferencing apparatus to a projection mode and the screen of the video conferencing apparatus 110A is directly from the screen (i.e. video output) of the first video output device 120, the video conferencing apparatus 110A will no longer display the screen from the video conferencing apparatus 110B of user B. In other words, both of the video conferencing apparatuses 100A and 100B may simultaneously display the same screen from the first video output device 120.

Figure 2B:
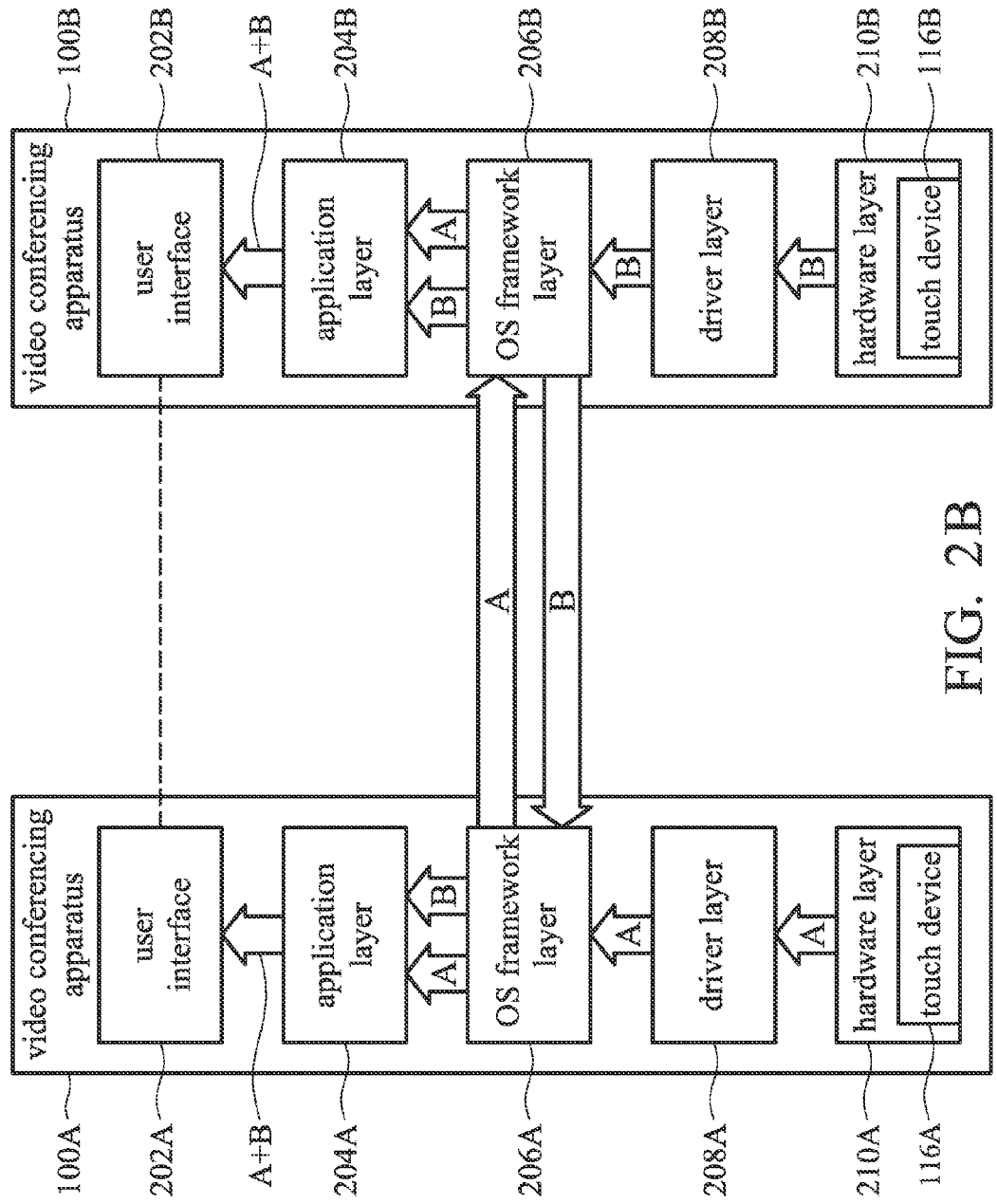
FIG. 2B is a diagram of software/hardware architecture of the video conferencing apparatus in a video conference in accordance with an embodiment of the invention.

FIG. 2B is a diagram of the software/hardware architecture of the video conferencing apparatus in a video conference in accordance with an embodiment of the invention. In an embodiment, the Android operating system is used in the video conferencing apparatuses 110A and 110B. For example, the software/hardware architecture of the video conferencing apparatus 110A comprises a user interface 202A, an application layer 204A, an OS framework layer 206A, a kernel driver layer 208A, and a hardware layer 210A, and the software/hardware architecture of the video conferencing apparatus 110B is analogous to that of the video conferencing apparatus 110A. In an embodiment, when the connection of a video conference between the video conferencing apparatuses 110A and 110B has been established, a transparent layer is activated on both the video conferencing apparatuses 110A and 110B as an interaction whiteboard. When user A has switched the video conferencing apparatus 110A to a HDMI projection mode (i.e. switched to the screen of the first video output device 120), user A and user B may see the same screen from the first video output device 120 on both the video conferencing apparatuses 110A and 110B. User A and user B may also perform associated touch actions such as drawing lines, writing text, or painting colors on the transparent layer on the video conferencing apparatus 110A or the video conferencing apparatus 110B for interaction, but the invention is not limited thereto.

Specifically, when there is touch input from user A on the touch panel 111A of the video conferencing apparatus 110A (i.e. input touch event A), the hardware layer 210A of the video conferencing apparatus 110A transmits touch event A to the OS framework layer 206A. Video/audio signal packets of the video conference are exchanged using the SIP channel between the OS framework layers 206A and 206B of the video conferencing apparatuses 110A and 110B. The OS framework layer 206A of the video conferencing apparatus 110A transmit touch event A through the audio channel of the SIP channel to the OS framework layer 206B of the video conferencing apparatus 110B. The OS framework layer 206B may regard the received touch event A as if touch event A was received locally from the driver layer 208B, and transmit touch event A to the application layer 204B. Then, the operations corresponding to touch event A can be drawn on the user interface 202B via the application layer 204B. That is, user A may write text on the video conferencing apparatus 110A, and the user interface 202B of the video conferencing apparatus 110B may simultaneously display the text written by user A.

Additionally, when there is touch input from user B on the touch panel 111A of the video conferencing apparatus 110B (i.e. input touch event B), the hardware layer 210B of the video conferencing apparatus 110B transmits touch event A to the OS framework layer 206B. Video/audio signal packets of the video conference are exchanged using the SIP channel between the OS framework layers 206A and 206B of the video conferencing apparatuses 110A and 110B. The OS framework layer 206B of the video conferencing apparatus 110B transmit touch event B through the audio channel of the SIP channel to the OS framework layer 206A of the video conferencing apparatus 110A. The OS framework layer 206A may regard the received touch event B as if touch event B was received locally from the driver layer 208A, and transmit touch event B to the application layer 204A. Then, the operations corresponding to touch event A can be drawn on the user interface 202A via the application layer 204A. That is, user B may write text on the video conferencing apparatus 110B, and the user interface 202A of the video conferencing apparatus 110A may simultaneously display the text written by user B.

Specifically, the audio channel of the SIP channel is utilized to transmit touch events in the invention. Since the size of the audio signal is very small relative to that of the video signal, the video conferencing apparatus 110A may pack touch event A input by user A into the audio packet, and transmit the audio packet to the video conferencing apparatus 110B of user B. The video conferencing apparatus 110B may retrieve touch event A after unpacking the received audio packet, and transmit touch event A to the corresponding application layer, so that the operations corresponding to touch event A can be drawn on the user interface. Additionally, user B may also perform similar touch events, such as writing texts or drawing lines, on the transparent layer of the video conferencing apparatus 110B, and the same screen can be displayed on both the video conferencing apparatuses 110A and 110B, thereby achieving content sharing and interaction. It should be noted that the video conferencing apparatuses 110A and 110B both have the ability to process local touch events, and the video conferencing apparatuses 110A and 110B may further perform corresponding operations by processing remote touch events of other users as if processing local touch events in the invention.

Figure 3:
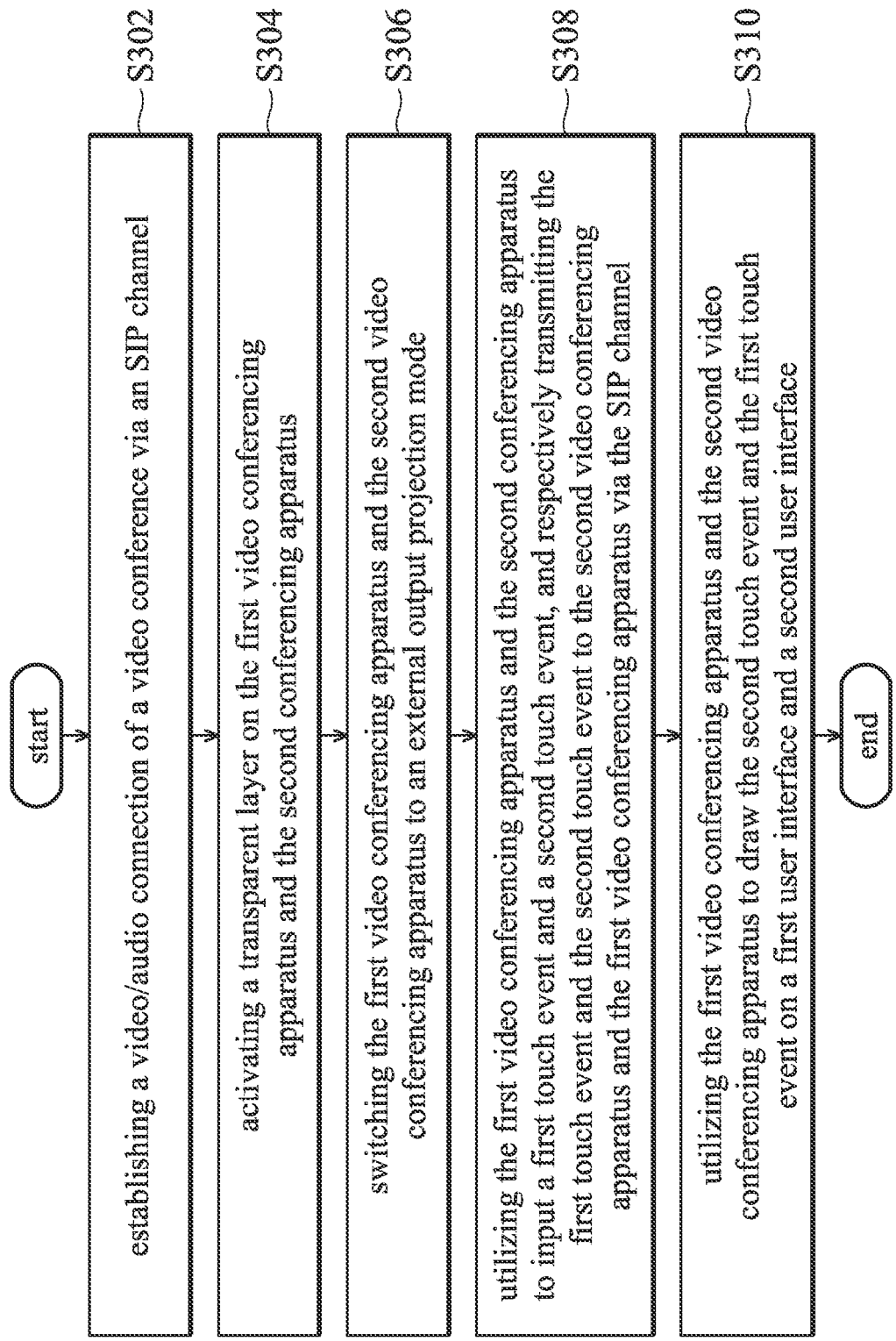
FIG. 3 is a flow chart of a video conference interaction display method in accordance with an embodiment of the invention.

FIG. 3 is a flow chart of a video conference interaction display method in accordance with an embodiment of the invention. In step S302, a video/audio connection of a video conference between a first video conferencing apparatus and a second conferencing apparatus is established through an SIP channel. In step S304, a transparent layer is activated on the first video conferencing apparatus and the second video conferencing apparatus. In step S306, the first video conferencing apparatus and the second video conferencing apparatus are switched to an external output projection mode (e.g. displaying the screen of a first video output device 120).

In step S304, a first touch event and a second touch event are respectively input on the first video conferencing apparatus and the second video conferencing apparatus, and the first touch event and the second touch event are transmitted to the second video conferencing apparatus and the first video conferencing apparatus through the SIP channel.

In step S310, an application layer of the first video conferencing apparatus and the second video conferencing apparatus respectively draws the second touch event and the first touch event on a first user interface and a second user interface, thereby achieving content sharing and interaction.

In view of the above, a video conferencing apparatus is provided, and the video conferencing apparatus is capable of receiving a touch event on a transparent layer of the video conferencing apparatus, and transmitting the touch event to another video conferencing apparatus in the video conference via an SIP channel, so that the another may perform corresponding operations and inputs as if the touch event were input to the other video conferencing apparatus locally. Meanwhile, the video conferencing apparatus is further capable of receiving touch events from other video conferencing apparatuses, and performing corresponding operations or inputs, so that each video conferencing apparatus in the video conference shares the same screen and operations.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video conferencing system, comprising:
    a first video conferencing apparatus, comprising a first touch panel; and
    a second video conferencing apparatus, comprising a second touch panel,
    wherein a video/audio connection of a video conference between the first video conferencing apparatus and the second video conferencing apparatus is established via a session initialization protocol (SIP) channel,
    wherein when the video/audio connection of the video conference has been established, a transparent layer is activated on the first video conferencing apparatus and the second conferencing apparatus,
    wherein when the first video conferencing apparatus and the second video conferencing apparatus are switched to an external output projection mode, a first touch event and a second touch event are input on the first touch panel and the second touch panel, and the first touch event and the second touch event are respectively transmitted to the second video conferencing apparatus and the first video conferencing apparatus via the SIP channel,
    wherein the first video conferencing apparatus and the second video conferencing apparatus draw the second touch event and the first touch event on a first user interface and a second user interface, wherein the first user interface is identical to the second user interface.

2. The video conferencing system as claimed in claim 1, wherein the first touch panel and the second touch panel are optical touch panels.

3. The video conferencing system as claimed in claim 1, wherein the first touch panel and the second touch panel are capacitive touch panels.

4. The video conferencing system as claimed in claim 1, wherein the external output projection mode indicates that a video output device outputs a screen to the first video conferencing apparatus and the second video conferencing apparatus, and the screens are simultaneously displayed on the first video conferencing apparatus and the second video conferencing apparatus.

5. The video conferencing system as claimed in claim 1, wherein the first video conferencing apparatus and the second video conferencing apparatus transmit the first touch event and the second touch event to the second video conferencing apparatus and the second video apparatus via an operating framework layer, respectively.

6. A video conference interaction display method, for use in a video conferencing system, wherein the video conferencing system comprises a first video conferencing apparatus and a second video conferencing apparatus, the method comprising:
    establishing a video/audio connection of a video conference between the first video conferencing apparatus and the second video conferencing apparatus via a session initialization protocol (SIP) channel;
    activating a transparent layer on the first video conferencing apparatus and the second conferencing apparatus when the video/audio connection of the video conference has been established;
    when the first video conferencing apparatus and the second video conferencing apparatus are switched to an external output projection mode, utilizing the first video conferencing apparatus and the second conferencing apparatus to input a first touch event and a second touch event, and respectively transmitting the first touch event and the second touch event to the second video conferencing apparatus and the first video conferencing apparatus via the SIP channel; and
    utilizing the first video conferencing apparatus and the second video conferencing apparatus to draw the second touch event and the first touch event on a first user interface and a second user interface, wherein the first user interface is identical to the second user interface.

7. The video conference interaction display method as claimed in claim 6, wherein the first video conferencing apparatus comprises a first touch panel, and the second video conferencing apparatus comprises a second touch panel, and the first touch panel and the second touch panel are optical touch panels.

8. The video conference interaction display method as claimed in claim 6, wherein the first video conferencing apparatus comprises a first touch panel, and the second video conferencing apparatus comprises a second touch panel, and the first touch panel and the second touch panel are capacitive touch panels.

9. The video conference interaction display method as claimed in claim 6, wherein the external output projection mode indicates that a video output device outputs images on a screen to the first video conferencing apparatus and the second video conferencing apparatus, and the screen is simultaneously displayed on the first video conferencing apparatus and the second video conferencing apparatus.

10. The video conference interaction display method as claimed in claim 6, further comprising:
   utilizing the first video conferencing apparatus and the second video conferencing apparatus to transmit the first touch event and the second touch event to the second video conferencing apparatus and the second video apparatus via an operating framework layer, respectively.

\* \* \* \* \*